(12) United States Patent
Rios (10) Patent No.: US 11,025,311 B1
(45) Date of Patent: Jun. 1, 2021

(54) METHODS AND APPARATUS FOR ORTHOGONAL STREAM SPATIAL MULTIPLEXING AND BEAMFORMING

(71) Applicant: Carlos A. Rios, Sunnyvale, CA (US)

(72) Inventor: Carlos A. Rios, Sunnyvale, CA (US)

( * ) Notice: Subject to any disclaimer, the term of this patent is extended or adjusted under 35 U.S.C. 154(b) by 0 days.

(21) Appl. No.: 17/006,731

(22) Filed: Aug. 28, 2020

(51) Int. Cl.
*H04B 7/10* (2017.01)
*H04B 7/0426* (2017.01)
*H04B 7/06* (2006.01)
*H04B 7/08* (2006.01)

(52) U.S. Cl.
CPC ........... *H04B 7/043* (2013.01); *H04B 7/0697* (2013.01); *H04B 7/0854* (2013.01); *H04B 7/10* (2013.01)

(58) Field of Classification Search
CPC ...... H04B 7/0617; H04B 7/10; H04B 7/0413; H04B 7/0408; H04B 7/043; H04B 7/04; H04B 7/0684; H04B 7/0697; H04B 7/0854; H01Q 21/24; H01Q 25/001
See application file for complete search history.

(56) References Cited

U.S. PATENT DOCUMENTS

| | | | | |
|---|---|---|---|---|
| 7,957,425 B2 * | 6/2011 | Macrae | ..................... | H04B 7/10 370/480 |
| 10,848,207 B2 | 11/2020 | Rios | | |
| 2007/0047678 A1 | 3/2007 | Sibecas et al. | | |
| 2009/0197544 A1 | 8/2009 | Petersson | | |
| 2012/0162008 A1 | 6/2012 | Eom et al. | | |
| 2017/0373743 A1 | 12/2017 | Park | | |
| 2021/0028829 A1 | 1/2021 | Rios | | |

OTHER PUBLICATIONS

Taiwan Office Action dated Feb. 8, 2021 for related Taiwan application No. 109106360 with English translation, pp. 1-20.

* cited by examiner

*Primary Examiner* — Rahel Guarino
(74) *Attorney, Agent, or Firm* — Intellectual Property Law Group LLP (57) ABSTRACT

Methods and apparatus for orthogonal stream spatial multiplexing and beamforming. In one embodiment, a method includes injecting a Data Stream into a transmitter apparatus that splits, modulates, spatially multiplexes and transmit beamforms it into n spatial streams input to corresponding code-controlled selectable polarization antennas that each radiates a stream that is polarization orthogonal to or uncorrelated with the other n−1 radiated streams. The method includes detecting the radiated streams at a receiver apparatus comprising n selectable polarization antennas correspondingly controlled by the same codes. Each receive antenna match-polarization filters the incident radiated stream aggregate to recover one corresponding spatial stream. The n recovered spatial streams are then receive beamformed, spatially demultiplexed, demodulated and recombined into the original Data Stream. As n can be arbitrarily large, orthogonal stream spatial multiplexing and beamforming provides a mechanism for arbitrarily increasing the information rate of a highly directional, fixed frequency and bandwidth wireless channel.

20 Claims, 6 Drawing Sheets

METHODS AND APPARATUS FOR ORTHOGONAL STREAM SPATIAL MULTIPLEXING AND BEAMFORMING

CROSS-REFERENCE TO RELATED APPLICATIONS

This application is related to co-pending U.S. patent application Ser. No. 16/379,692, filed on Apr. 9, 2019, having the same inventor, and entitled "METHODS AND APPARATUS FOR ORTHOGONAL STREAM SPATIAL MULTIPLEXING." The application Ser. No. 16/379,692 claims the benefit under 35 U.S.C. § 119 of U.S. Provisional Application No. 62/812,925, filed on Mar. 1, 2019, and entitled "METHODS AND APPARATUS FOR ORTHOGONAL STREAM SPATIAL MULTIPLEXING." These related applications are incorporated herein by reference in their entirety.

FIELD

The exemplary embodiments of the present invention relate to the field of telecommunications. More specifically, the exemplary embodiments of the present invention relate to the operation of wireless communication networks.

BACKGROUND

With the rapidly growing trend for mobile and remote fixed data access over high-speed wireless communication networks, increasing the number of users as well as the amount of data those users consume has become of primary importance. Long Term Evolution (LTE) Fourth Generation (4G) cellular networks, for example, currently utilize multiple-input-multiple-output (MIMO) techniques that have significantly increased available mobile capacity over that of their non-MIMO predecessors. However, the projected demand for wireless bandwidth even in the relatively near future far exceeds what even the highly touted next generation Fifth Generation (5G) technology can practically provide.

Therefore, a mechanism that can vastly increase the data transfer capacity of wireless communications networks is extremely desirable.

SUMMARY

The following summary illustrates simplified versions of one or more aspects of the present invention. The purpose of this summary is to present key concepts in a simplified manner pending more detailed descriptions later.

In various exemplary embodiments, methods and apparatus for orthogonal stream spatial multiplexing and beamforming ("OSSMBF") are provided that would greatly expand wireless network data transfer capacity and, in many instances, communications range. In an exemplary embodiment, an "Originating Data Stream" requiring point to point wireless transmission to a remote destination is input to an OSSMBF-capable transmitter. The digital data stream is therein split and modulated into n Tx radio streams, which are then spatially multiplexed and transmit beamformed into n RF Tx spatial streams by a MIMO transmitter. The Tx spatial streams are then fed to n corresponding "OSSMBF Tx Apparatus" that uniquely enable transmit-side orthogonal stream spatial multiplexing and beamforming. An "OSSMBF Tx Method" causes the n distinct OSSMBF Tx Apparatus to toggle the instantaneous polarization of their corresponding Tx spatial streams in a distinct time varying manner reciprocally orthogonal to or uncorrelated with that of the other Tx spatial streams. The n resulting "OSSMBF streams" (each carrying distinct data, exhibiting unique time-varying polarization and featuring incrementally stepped carrier phase but otherwise displaying identical amplitude, modulation, bandwidth and frequency channelization) are then simultaneously launched wirelessly in a precise spatial direction to the desired destination. In this fashion, the OSSMBF Tx Apparatus and OSSMBF Tx Method combine to split, modulate, spatially multiplex and transmit beamform an Originating Data Stream into a plurality of Tx spatial streams and then distinctly polarize the Tx spatial streams into a plurality of corresponding OSSMBF streams so to enable their concurrent, co-channel and mutual interference-free directional transmission to a common destination location.

The n radiated OSSMBF streams impinge upon n corresponding "OSSMBF Rx Apparatus" (that uniquely enable the receive-side orthogonal stream spatial multiplexing and beamforming) at a destination OSSMBF-capable receiver. An "OSSMBF Rx Method" varies the instantaneous polarization of each of the n OSSMBF Rx Apparatus in a manner conforming identically to that of a distinct one of the OSSMBF Tx Apparatus in order to produce n "matched polarization filters" that each passes unsuppressed to a MIMO receiver only one of the n polarization filtered OSSMBF streams, and suppresses the n−1 others. This allows the destination MIMO receiver to input n partially separated and extricated Rx spatial streams in order to subsequently receive beamform and spatially demultiplex them into fully separated and extricated Tx radio streams and then demodulate and digitally recombine them all back into the Originating Data Stream. In this fashion the OSSMBF Rx Apparatus and OSSMBF Rx Method combine to distinctly polarization filter a plurality of wirelessly aggregated, directionally detected OSSMBF streams into a corresponding plurality of Rx spatial streams which are then receive beamformed, spatially demultiplexed, demodulated and digitally aggregated into the Originating Data Stream, thereby consummating concurrent, co-channel and mutual interference-free directional OSSMBF transmission from a source location.

The principal benefit of OSSMBF is its ability to wirelessly transmit an arbitrarily large number n of RF spatial streams (each carrying distinct data but otherwise featuring identical amplitude, modulation and bandwidth) on the same frequency channel to the same destination, effectively multiplying the data transfer capacity of any such fixed frequency, modulation and bandwidth communications link by a factor of n. In addition, when the streams incorporate properly stepped carrier phasing (i.e., phased array beamforming) the communications range of said link may also increase significantly.

Existing MIMO spatial multiplexing techniques (universally dependent on terrestrial multipath propagation to provide the partial radiated stream separation and extrication required for subsequent full individual stream separation and extrication at the MIMO receiver) can only guarantee 2× data transfer rates (and in practice only deliver 4× maximum under very special circumstances) regardless of the MIMO spatial multiplexing order n employed. And quite significantly, said dependence on dissimilar stream propagation paths (and concomitant carrier phase non-coherence) fully negates incorporating phased array techniques to increase link communications range as described above.

In an embodiment, a transmitter apparatus is provided that comprises a MIMO transmitter and a plurality of transmit antenna circuits. The MIMO transmitter inputs a Data Stream and outputs a corresponding plurality of stepped phase coherent but otherwise equal amplitude, modulation, bandwidth and frequency RF Tx spatial streams and a similarly corresponding plurality of digital binary time-varying orthogonal or uncorrelated sequenced polarization control signals, respectively. Each Tx spatial stream is associated with a corresponding polarization control signal. Each transmit antenna circuit comprises first and second orthogonally polarized antenna elements and an RF switch that selectively connects its input Tx spatial stream to the first and second orthogonally polarized antenna element based on the corresponding polarization control signal in order to radiate a distinct time-varying polarized OSSMBF stream. In the above fashion, this transmitter apparatus provides a MIMO transmitter for converting a Data Stream into a plurality of Tx spatial streams and a plurality of transmit antenna circuits for distinctly polarizing those Tx spatial streams into radiated OSSMBF streams for concurrent, co-channel and mutual interference-free directional transmission to a remote location.

In an embodiment, a transmitter apparatus is provided that comprises a MIMO transmitter that receives a Data Stream and generates a plurality of Tx spatial streams that are spatially encoded for concurrent, co-channel transmission and transmit beamformed for radiation in a precise spatial direction. The apparatus also comprises a code generator that generates a plurality of distinct polarization control signals. The apparatus also comprises a plurality of transmit antenna circuits that receive the plurality of Tx spatial streams and the plurality of polarization control signals and generate a plurality of distinctly polarized radiated streams. Each transmit antenna circuit comprises first and second orthogonally polarized transmit antenna elements, and an RF switch that selectively connects a Tx spatial stream to the first and second orthogonally polarized transmit antenna elements based on a corresponding polarization control signal.

In an embodiment, a receiver apparatus is provided that comprises a plurality of receive antenna circuits and a MIMO receiver. Each antenna circuit directionally detects a corresponding plurality of concurrent, co-channel radiated OSSMBF streams each featuring distinct reciprocally orthogonal or uncorrelated time-varying polarization and stepped carrier phase but otherwise identical amplitude, modulation and bandwidth. Each receive antenna circuit inputs from the MIMO receiver a distinct binary time-varying polarization control signal identical to a distinct one of the polarization control signals generated in the corresponding MIMO transmitter. Each distinct OSSMBF stream is associated with a corresponding polarization control signal. Each receive antenna circuit comprises first and second orthogonally polarized antenna elements and an RF switch that selectively connects outputs of the first and second orthogonally polarized antenna elements to the MIMO receiver based on the corresponding polarization control signal in order to pass unsuppressed only the one polarization-filtered OSSMBF stream associated with its particular polarization control signal, while significantly suppressing all the other streams. In the above fashion, this receiver apparatus provides a plurality of receive antenna circuits for distinctly polarization filtering a plurality of OSSMBF streams into a corresponding plurality of Rx spatial streams and a MIMO receiver for subsequently converting the Rx spatial streams back into the original Data stream in order to consummate their concurrent, co-channel, mutual interference-free transmission in a precise spatial direction from a remote location.

In an embodiment, a receiver apparatus is provided that comprises a MIMO receiver that generates a plurality of polarization control signals, and a plurality of receive antenna circuits that each detects a plurality of concurrent, co-channel, stepped carrier phase coherent and distinctly polarized radiated streams, receives a distinct one of a plurality of polarization control signals, and outputs an Rx spatial stream comprising one unsuppressed polarization-filtered radiated stream. Each receive antenna circuit comprises first and second orthogonally polarized receive antenna elements, and an RF switch that selectively connects outputs of the first and second orthogonally polarized receive antenna elements to the MIMO receiver based on a corresponding polarization control signal. The MIMO receiver generates a Data Stream by spatially decoding and receive beamforming from a precise spatial direction, a plurality of Rx spatial streams to consummate concurrent, co-channel transmission.

In an embodiment, a method is provided that comprises MIMO-converting a Data Stream into a plurality of concurrent, stepped carrier phase coherent, cochannel and equal amplitude, modulation and bandwidth RF Tx spatial streams for input into a plurality of selectable polarization transmit antennas. Each transmit antenna impresses its corresponding Tx spatial stream with time-varying polarization that is reciprocally orthogonal to or uncorrelated with the other Tx spatial streams in order to radiate a corresponding plurality of distinctly polarized concurrent, co-channel OSSMBF streams in a precise spatial direction. The method also comprises receiving said plurality of OSSMBF streams at a plurality of selectable polarization receive antennas. Each receive antenna impresses its detected plurality of OSSMBF streams with polarization filtering to match the time-varying polarization of one selected OSSMBF stream in order to pass unsuppressed to downstream receiver circuitry that one stream while significantly suppressing all others. The resulting plurality of polarization filtered Rx spatial streams are then MIMO-converted into an Rx Data stream for subsequent conversion into the original Data Stream. In the above fashion, this method employs distinct transmitted signal polarization combined with corresponding received signal polarization filtering to provide for the concurrent, co-channel, mutual interference-free and highly directional point to point transmission of an arbitrarily large number of spatially multiplexed and beamformed spatial streams bearing, in the aggregate, a correspondingly large Data Stream.

Additional features and benefits of the exemplary embodiments of this invention will become apparent from the description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Aspects of the present invention are described here in the context of methods and/or apparatus for orthogonal stream spatial multiplexing and beamforming.

The purpose of the following detailed description is to provide a thorough understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that while such a development effort might be complex and time-consuming, it would nevertheless be a routine engineering undertaking for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

Figure 1:
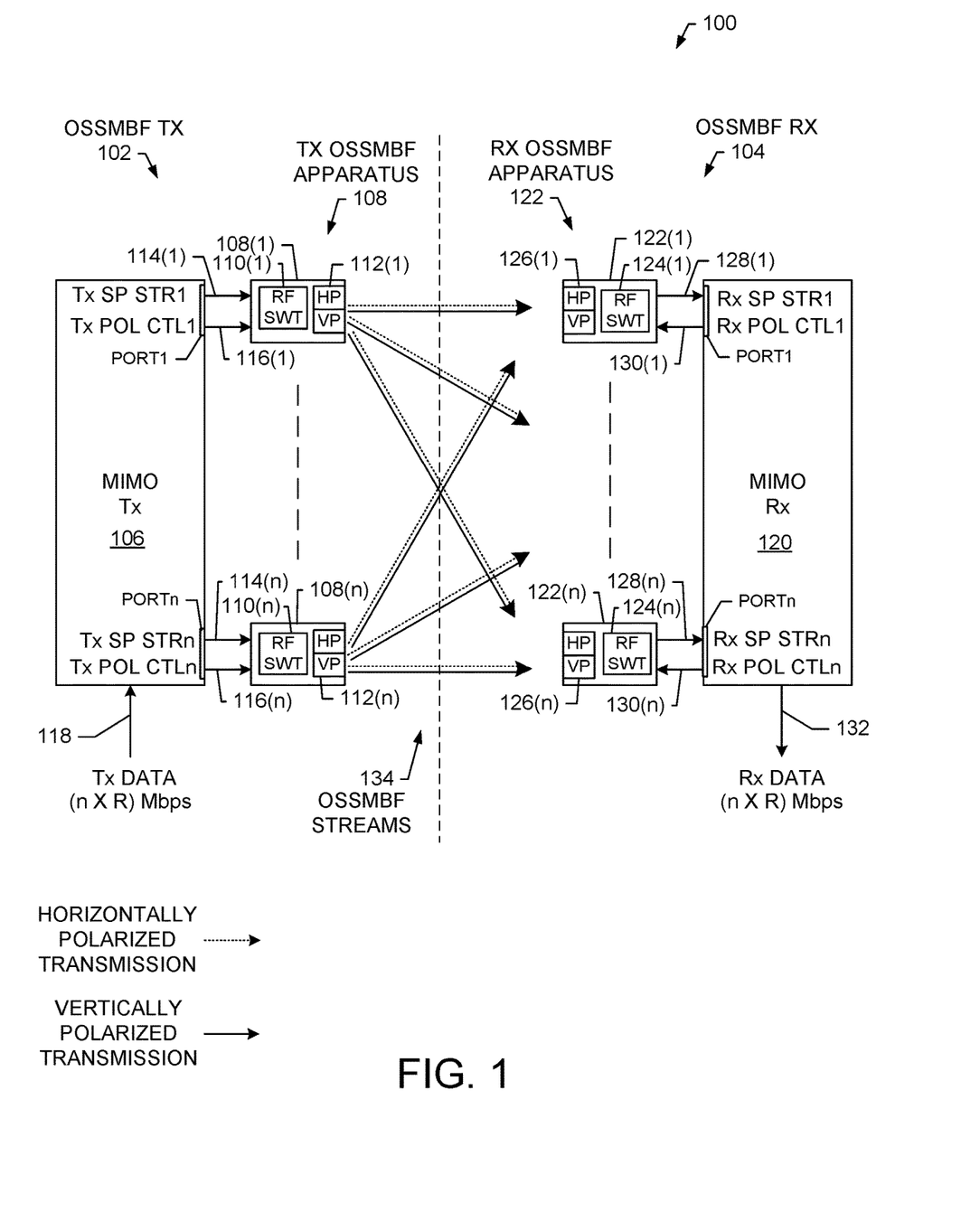
FIG. 1 shows a communication network comprising an exemplary embodiment of a transmitter and an exemplary embodiment of a receiver that together perform orthogonal stream spatial multiplexing and beamforming.

FIG. 1 shows a wireless communications network 100 comprising an exemplary embodiment of an OSSMBF transmitter ("OSSMBF Tx") 102 and an exemplary embodiment of an OSSMBF receiver ("OSSMBF Rx") 104 that together perform orthogonal stream spatial multiplexing and beamforming. For additional details on stream spatial multiplexing, the reader is referred to co-pending U.S. patent application Ser. No. 16/379,692, filed on Apr. 9, 2019, having the same inventor, and entitled "METHODS AND APPARATUS FOR ORTHOGONAL STREAM SPATIAL MULTIPLEXING.

Transmitter Description

The OSSMBF Tx 102 comprises an n order (e.g., n being an integer greater than 2) MIMO spatial multiplexing and beamforming enabled transmitter ("MIMO Tx") 106 and a plurality of (n) transmitter antenna circuits 108(1-$n$) (also referred to herein as "Tx OSSMBF Apparatus") that comprise RF switches 110(1-$n$) and dual polarization Tx antennas 112(1-$n$). For example, each dual polarization Tx antenna provides horizontal polarization (HP) and vertical polarization (VP) antenna elements. In an embodiment, the MIMO Tx 106 receives a data stream Tx Data 118 having a data rate of (n×R) Mbps. The MIMO Tx 106 splits, modulates, spatially multiplexes and beamforms the Tx Data 118 into n concurrent, co-channel Tx spatial streams 114(1-$n$), each bearing distinct data of rate R Mbps but exhibiting identical amplitude, modulation, bandwidth and center frequency plus incrementally stepped carrier phase.

The MIMO Tx 106 provides n Tx ports (PORT1-n), and each port is connected to an RF switch 110 of a corresponding a transmitter antenna circuit 108. Each RF switch 110 receives from the MIMO Tx 106 a respective Tx spatial stream 114 at an RF input and a corresponding Tx polarity control signal 116 at a control input. The RF switch 110 features two RF outputs that are selectively connected to the RF input in response to the control signal 116. The two outputs are connected to two orthogonally polarized elements of the dual polarization transmit antenna 112, respectively. A first output of the RF switch 110 is connected to the vertical polarization (VP) element of the transmit antenna 112. A second output of the RF switch 110 is connected to the horizontal polarization (HP) element of the transmit antenna 112. Thus, each of the RF switches 110 have inputs connected to the MIMO Tx 106 and outputs connected to the vertical and horizontal polarization elements of their respective dual polarization Tx antennas 112.

During the transmit operation, the data stream Tx Data 118 is input to the MIMO Tx 106 and therein split and radio modulated into n equal amplitude, modulation and bandwidth Tx radio streams. The n Tx radio streams are then spatially multiplexed and carrier phase adjusted (i.e., transmit beamformed) into n distinct concurrent, co-channel and stepped carrier phase coherent Tx spatial streams 114(1-$n$). Each Tx spatial stream is routed to a corresponding RF switch 110 of a transmit antenna circuit 108 along with a polarization control signal 116. The polarization control signal 116 controls how the RF switch 110 connects the Tx spatial stream at its RF input to the vertical and horizontal polarization elements of the corresponding dual polarization transmit antenna 112. The polarization control signals 116 are configured to time-vary the instantaneous polarization of a given Tx spatial stream according to either a) a distinct $n^{th}$ order orthogonal binary (such as a Walsh or Gold) code so that the resulting radiated stream exhibits distinct, reciprocally orthogonal polarization over time with respect to every other radiated stream, or b) one of n uncorrelated codes (such as PN) so that the resulting radiated stream exhibits distinct, reciprocally uncorrelated polarization over time with respect to every other radiated stream. In this fashion the OSSMBF Tx 102 receives the Tx Data 118 and outputs n either polarization-orthogonal or polarization-uncorrelated OSSMBF streams 134 of equal amplitude, modulation, bandwidth and center frequency plus stepped carrier phase (i.e., transmit beamformed) for concurrent, co-channel, mutual interference-free directional transmission towards the OSSMBF Rx 104.

Receiver Description

The OSSMBF Rx 104 contains an analogous $n^{th}$ order MIMO spatial demultiplexing and beamforming-enabled receiver ("MIMO Rx") 120 and a plurality of (n) receiver antenna circuits 122(1-$n$) (also referred to herein as "Rx OSSMBF Apparatus") that each comprise an RF switch 124(1-n) and a dual polarization Rx antenna 126(1-n). Each Rx antenna 126 detects at its vertical and horizontal polarization elements RF signals comprising the plurality of concurrent, co-channel and stepped carrier phase coherent OSSMBF streams 134 radiated from the OSSMBF Tx 102. Each RF switch 124 receives at its RF inputs the correspondingly polarization-filtered OSSMBF streams 134 from the vertical and horizontal antenna elements, such as from antenna 126 within OSSMBF Rx Apparatus 122. Each RF switch 124 receives at its control input a corresponding Rx polarity control signal 130 from MIMO Rx 120. A first RF input to the RF switch 124 is connected to a vertical polarization (VP) element of the receive antenna 126. A second RF input to the RF switch 124 is connected to a horizontal polarization (HP) element of the receive antenna 126. The output of the RF switch 124 is connected directly to an Rx port (PORT1-n) of MIMO Rx 120. In a similar manner, each of the RF switches of the receiver antenna circuits 122(1-n) have RF inputs connected to vertical and horizontal polarization elements of their respective dual polarization receive antennas, and outputs connected to corresponding Rx ports of MIMO Rx 120.

During the receive operation, the MIMO Rx 120 provides distinct polarization control signals to each of the n receiver antenna circuits 122(1-n). Each receiver antenna circuit's polarization control signal 130 as generated by MIMO Rx 120 is identical to the corresponding transmitter antenna circuit's polarization control signal 116 provided by the MIMO Tx 106. Thus, the n distinct polarization control signals used commonly by the Tx OSSMBF apparatus 108 and the Rx OSSMBF apparatus 122 effectively synthesize n "matched polarization filter" pairs that working in concert each pass to MIMO Rx 120 only one unsuppressed polarization-filtered OSSMBF stream, while significantly suppressing all the other streams. The resulting n partially separated and extricated Rx spatial streams 128 are then receive beamformed and spatially demultiplexed into fully separated and extricated Rx radio streams and then demodulated and digitally aggregated to form the final Rx Data 132 (corresponding identically to the original Tx Data 118) by the MIMO Rx 120.

Figure 2:
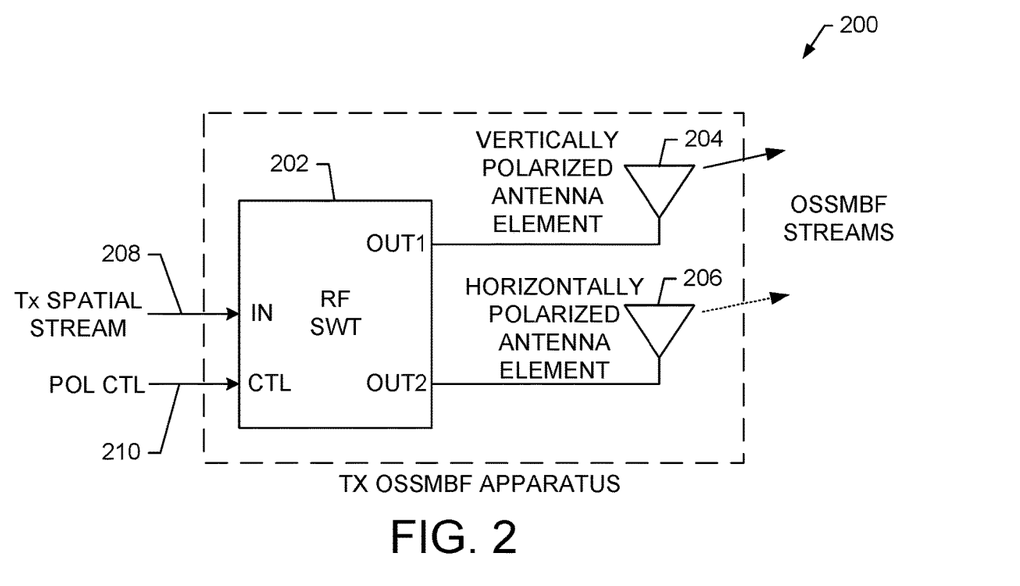
FIG. 2 shows an exemplary detailed embodiment of a transmit antenna circuit.

FIG. 2 shows an exemplary detailed embodiment of a transmit antenna circuit 200. For example, the transmit antenna circuit 200 is suitable for use as any of the transmit antenna circuits 108(1-n) shown in FIG. 1. The transmit antenna circuit 200 comprises an RF switch 202, a vertically polarized antenna element 204, and a horizontally polarized antenna element 206.

The RF switch 202 comprises an RF input port (IN), a digital control port (CTL), and two RF output ports (OUT1, OUT2). The RF switch 202 receives a Tx spatial stream 208 at the input port IN. A polarization control signal 210 is received at the control port CTL. The polarization control signal 210 comprises a binary stream of control bits. Each bit determines whether the input port IN is connected to the first output port OUT1 or the second output port OUT2. For example, when a polarity control bit is in a high or logic 1 state, the input port IN is connected to the first output port OUT1 and to the subsequent vertical polarization antenna element 204. When a polarity control bit is in a low or logic 0 state, the input port IN is connected to the second output port OUT2 and to the subsequent horizontal polarization antenna element 206. Thus, the polarization control signal 210 determines how the Tx spatial stream 208 is instantaneously polarized (i.e., toggled between horizontal polarization and vertical polarization) for transmission as an OSSMBF stream.

Figure 3:
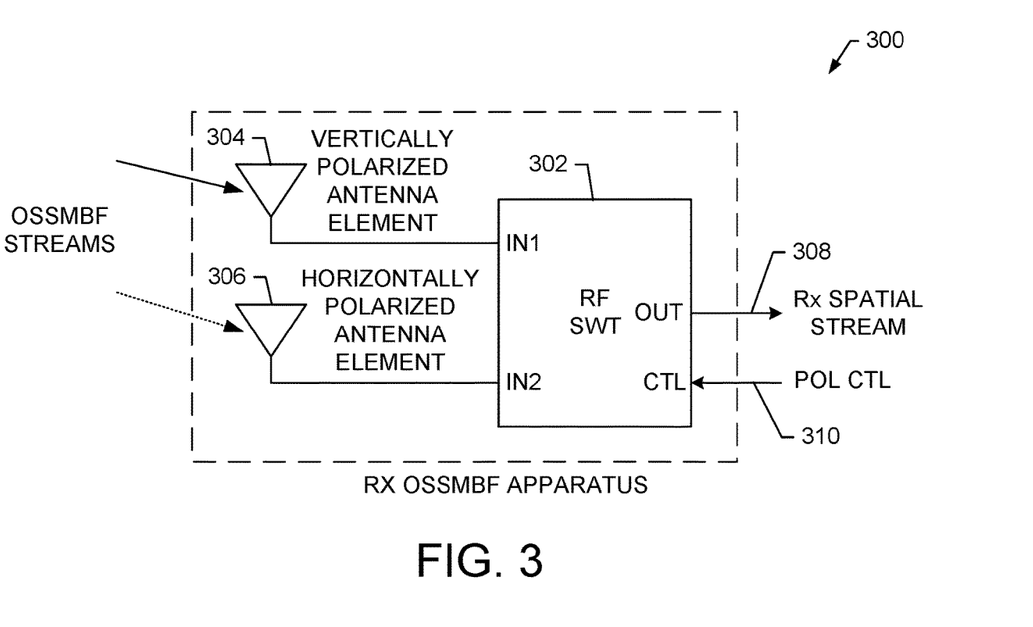
FIG. 3 shows an exemplary detailed embodiment of a receive antenna circuit.

FIG. 3 shows an exemplary detailed embodiment of a receive antenna circuit 300. For example, the receive antenna circuit 300 is suitable for use as any of the receive antenna circuits 122(1-n) shown in FIG. 1. The receive antenna circuit 300 comprises an RF switch 302, a vertically polarized antenna element 304, and a horizontally polarized antenna element 306.

The RF switch 302 comprises an RF output port (OUT), a digital control port (CTL), and two RF input ports (IN1, IN2). The vertically polarized antenna element 304 detects incident RF (such as the OSSMBF streams 134) and vertical polarization-filters it for routing to the first input port IN1 of the RF switch 302. The horizontally polarized antenna element 306 detects the same RF but horizontal polarization filters it for routing to the second input port IN2 of the RF switch 302. A polarization control signal 310 is received at the control port CTL. The polarization control signal 310 comprises a binary stream of control bits. Each bit determines whether the first input port IN1 or the second input port IN2 is connected to the output port OUT. For example, when a polarity control bit is in a high or logic 1 state, the first input port IN1 is connected to the output port OUT and vertical polarization-filtered OSSMBF streams pass to downstream MIMO receiver circuitry. When a polarity control bit is in a low or logic 0 state, the second port IN2 is connected to the output port OUT and horizontal polarization-filtered OSSMBF streams pass on to downstream MIMO receiver circuitry.

During operation, the polarity control signal 310 selectively connects the vertical polarization-filtered plurality of OSSMBF streams 134 at the first input port IN1 or the horizontal polarization-filtered plurality of OSSMBF streams 134 at the second input port IN2 to the output port OUT. Since the polarity control signal 310 is identical to a corresponding polarity control signal 116 used at the MIMO transmitter 106, switching between the vertically and horizontally polarized antenna elements synthesizes a matched time-varying polarization filter that passes unsuppressed to MIMO Rx 120 only that one of the OSSMBF streams 134 that is polarized exactly in accordance with the polarity control signal 310, while significantly suppressing all the other OSSMBF streams. Thus, the polarization control signal 310 determines how the plurality of received OSSMBF streams are polarization filtered to partially separate and extricate just one selected Rx spatial stream 128 (corresponding to one transmitted Tx spatial stream 114) in order to facilitate proper subsequent processing in MIMO Rx 120.

Figure 4A:
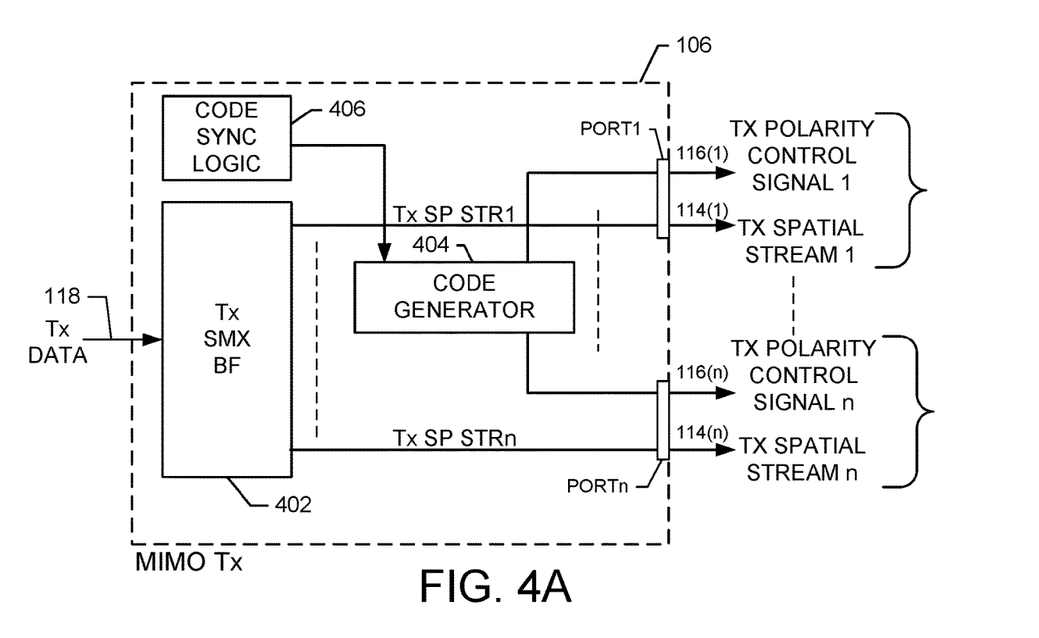
FIG. 4A shows an exemplary detailed embodiment of at least a portion of a MIMO Tx shown in FIG. 1.

FIG. 4A shows an exemplary detailed embodiment of at least a portion of the MIMO Tx 106 shown in FIG. 1. MIMO Tx 106 comprises Tx SMX BF 402, code generator 404, and code sync logic 406.

During operation, the n Tx spatial streams 114(1-n) generated by the Tx SMX BF 402 are output through PORT(1-n) to the RF switches (not shown) of the transmit antenna circuits 108. The code generator 404 generates n distinct orthogonal (e.g., Walsh) or uncorrelated (e.g., PN) digital binary codes 116(1-n) that are output through PORT(1-n) to the RF switches of the transmit antenna circuits. For example, Tx polarity control signal 1 116(1) and Tx spatial stream 1 114(1) are output from MIMO Tx 106 PORT(1) and input to the RF switch of the first transmit antenna circuit 108(1). Tx polarity control signal n 116(n) and Tx spatial stream n 114(n) are similarly output from PORT(n) and input to the RF switch of the $n^{th}$ transmit antenna circuit 108(*n*). In this fashion, the RF switch of each transmit antenna circuit is supplied with a distinct polarization control code that steers the corresponding Tx spatial stream through the dual polarization antenna's selected vertical or horizontal antenna element, thereby generating one distinct instantiation of n orthogonal or uncorrelated time-varying-polarized radiated OSSMBF streams.

In an embodiment, polarity code timing corresponds to an integer fraction of the transmitted stream's payload symbol rate. In one embodiment, the code sync logic 406 initializes the transmitter code generator 404 such that any and all transmit antenna circuit 108 polarization transitions coincide precisely with an integer multiple of Tx spatial stream symbol transitions.

Figure 4B:
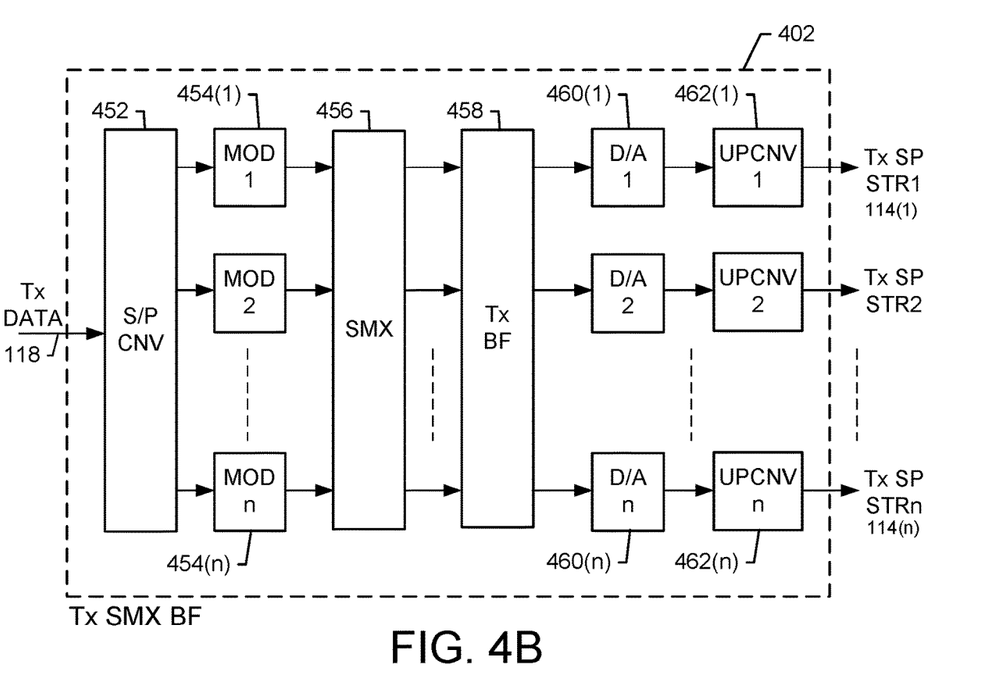
FIG. 4B shows an exemplary detailed embodiment of at least a portion of the Tx SMX BF shown in FIG. 4A

FIG. 4B shows an exemplary detailed embodiment of at least a portion of the Tx SMX BF 402 shown in FIG. 4A. The Tx SMX BF 402 comprises serial to parallel converter (S/P CNV) 452, radio modulators MOD1 454(1) through MODn **454(*n*), MIMO spatial multiplexer SMX 456, transmit beamformer Tx BF 458, digital to analog converters D/A1 460(1) through D/An 460(*n*) and RF upconverters UPCNV1 462(1) through UPCNVn 462(*n*)**.

During operation, transmit data stream Tx DATA 118 is input to S/P CNV 452, which splits the transmit data stream (having rate n×R Mbps) into n digital streams of R Mbps each and passes them to n radio modulators MOD1 454(1) through MODn **454(*n*). The n resulting Tx radio streams output from the modulators then pass to MIMO spatial multiplexer SMX 456 to spatially encode for concurrent, co-channel transmission. The n resulting Tx spatial streams then pass to transmit beamformer Tx BF 458 to step-adjust their individual carrier phases for directional transmission. The n resulting beamformed spatial streams then pass to individual digital to analog converters D/A1 460(1) through D/An 460(*n*) for transition into the analog domain. The n resulting analog beamformed spatial streams then pass to respective RF upconverters UPCNV1 462(1) through UPCNVn 462(*n*) for frequency translation to the proper common RF transmit center frequency, resulting in the Tx spatial streams 114**.

Figure 5A:
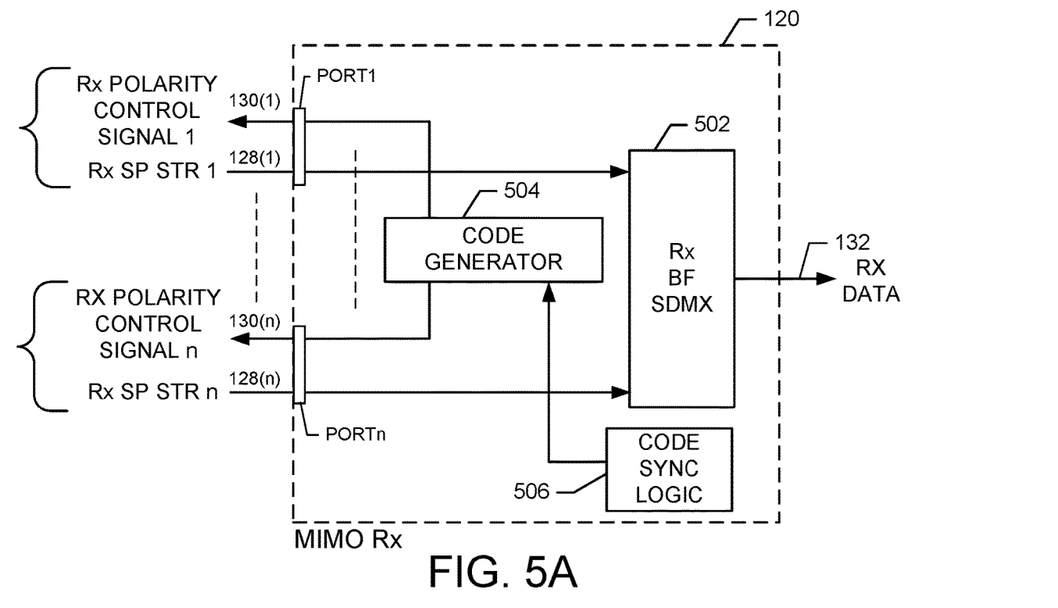
FIG. 5A shows an exemplary detailed embodiment of at least a portion of the MIMO Rx shown in FIG. 1.

FIG. 5A shows an exemplary detailed embodiment of at least a portion of the MIMO Rx 120 shown in FIG. 1. MIMO Rx 120 comprises Rx BF SDMX 502, code generator 504, and code sync logic 506.

During operation, the code generator 504 provides polarization control signals to the receiver antenna circuits 122. The polarization control signals generated by the code generator 504 correspond precisely to the polarization control signals generated in MIMO Tx 106 by the code generator 404. Signals output from the code generator 504 control how the n receiver antenna circuits 122 each "matched polarization-filter" the plurality of OSSMBF streams they detect into partially separated and extricated individual Rx spatial streams 128 for input to the Rx BF SDMX 502 of MIMO Rx 120. Each receiver antenna circuit varies its instantaneous Rx polarization according to the identical code employed at its corresponding transmitter antenna circuit. In this fashion, only the $m^{th}$ detected OSSMBF stream (radiated from the $m^{th}$ transmitter antenna circuit with time-varying polarization in accordance with the $m^{th}$ binary code) will propagate unsuppressed through the $m^{th}$ receiver antenna circuit (whose polarization also time-varies in accordance with the $m^{th}$ binary code) to Rx BF SDMX 502. The other m−1 detected OSSMBF streams incident at the $m^{th}$ receive antenna circuit will be suppressed in propagating to Rx BF SDMX 502.

In an embodiment, the code sync logic 506 operates to synchronize the polarization control codes between the OSSMBF Tx 102 and the OSSMBF Rx 104. In an embodiment, sync logic 506 has polarity code timing that corresponds to an integer fraction of the detected OSSMBF streams' payload symbol rate. During operation, the MIMO receiver 120 precisely recovers the payload symbol rate, which is referred to as "symbol synchronization." Once the MIMO receiver achieves symbol synchronization it readily also achieves polarity code synchronization via code sync logic 506. Thus, in one embodiment, the code sync logic 506 synchronizes the code generator 504 so that the Rx polarity control signals 130 faithfully mirror and time-track the Tx polarity control signals 116, such that any and all receiver antenna circuit 122 polarization transitions coincide precisely with integer multiples of received OSSMBF stream 134 symbol transitions.

Figure 5B:
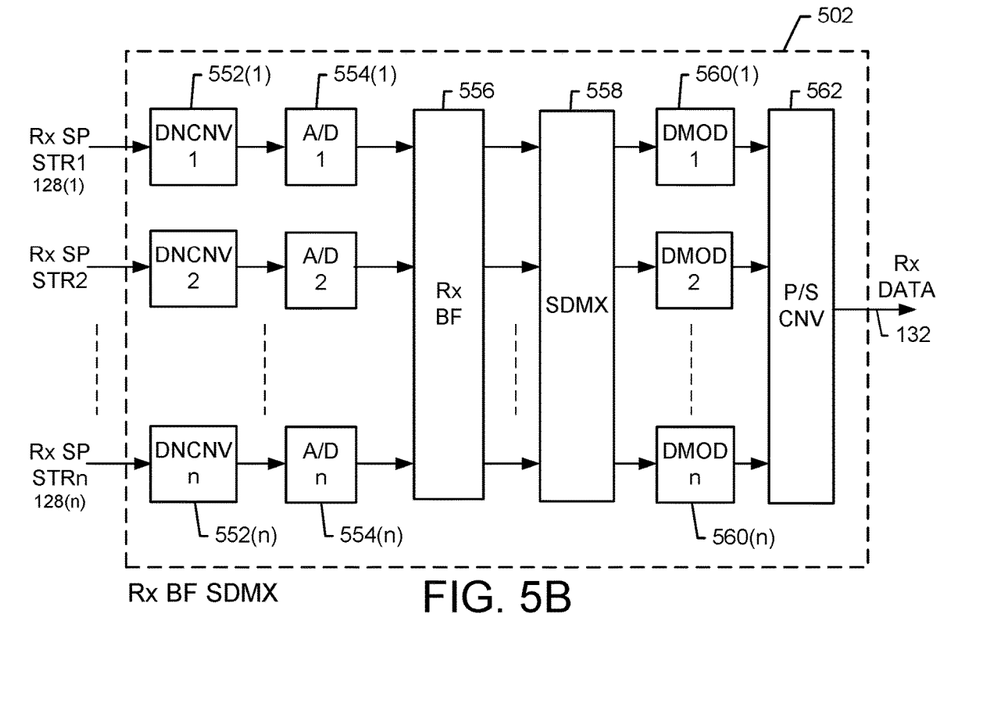
FIG. 5B shows an exemplary detailed embodiment of at least a portion of the Rx BF SDMX shown in FIG. 5A

FIG. 5B shows an exemplary detailed embodiment of at least a portion of Rx BF SDMX 502 shown in FIG. 5A. The Rx BF SDMX 502 comprises n RF downconverters DNCNV1 552(1) through DNCNVn **552(*n*), n analog to digital converters A/D1 554(1) through A/Dn 554(*n*), receive beamformer Rx BF 556, MIMO spatial demultiplexer SDMX 558, n radio demodulators DMOD1 560(1) through DMODn 560(*n*) and a digital data combiner parallel to serial converter (P/S CNV) 562**.

During operation, the n partially separated and extricated Rx spatial streams 128 are passed to n corresponding RF downconverters DNCNV(1-n) 552 within the Rx BF SDMX 502, where they are translated to baseband from the actual frequency channel of operation. The n resulting baseband spatial streams then pass to corresponding analog to digital converters A/D(1-n) 554 for translation into the digital domain. The n resulting digital domain Rx spatial streams pass on to receive beamformer Rx BF 556 where they are individually carrier phase adjusted for SNR-maximized reception from a precise spatial direction prior to passing to MIMO spatial demultiplexer SDMX 558. The SDMX 558 spatially decodes the receive beamformed Rx spatial streams into fully separated and extricated Rx radio streams by fully stripping away their accompanying suppressed polarization-filtered OSSMBF streams in order to maximize their individual signal to interference ratio (SIR) prior to passing on to corresponding radio demodulators DMOD 550. Signal to noise as well as signal to interference maximized by prior receive beamforming and spatial demultiplexing, the individual Rx radio streams are demodulated into digital data streams and pass on to parallel to serial converter P/S CNV 562 for aggregation into output Rx Data 132.

Figure 6:
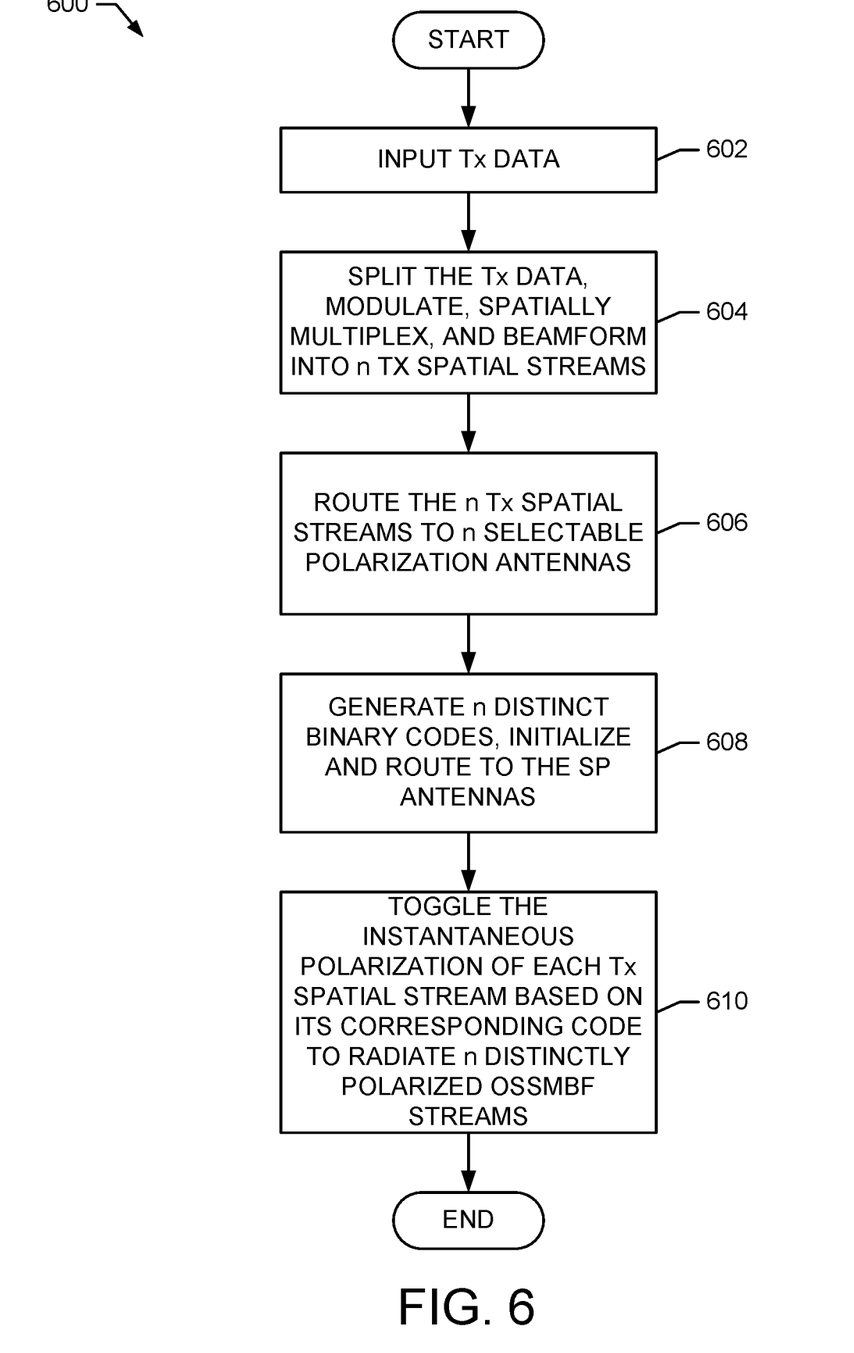
FIG. 6 shows a method for performing transmit orthogonal stream spatial multiplexing and beamforming in accordance with one embodiment of the present invention.

FIG. 6 shows a method 600 for performing transmit orthogonal stream spatial multiplexing and beamforming in accordance with one embodiment of the present invention. For example, in an exemplary embodiment, the method 600 is suitable for use by OSSMBF Tx 102 shown in FIG. 1.

At block 602, a transmit data stream of data rate n×R Mbps is input to an OSSMBF-enabled transmitter. For example, Tx Data 118 is input to MIMO Tx 106 of the OSSMBF Tx 102.

At block 604, the transmit data stream is split into n separate, equal data rate digital streams. The individual digital streams are then modulated, MIMO spatially multiplexed to enable concurrent, co-channel transmission, carrier phase adjusted (i.e., transmit beamformed) to enable directional transmission, converted from digital to analog and then RF upconverted to the operating frequency channel into n distinct Tx spatial streams. For example, the Tx SMX BF 402 processes the Tx Data 118 into n distinct Tx spatial streams 114 that are sequentially digitally split by S/P CNV 452, radio modulated by MODs 454, spatially multiplexed by SMX 456, beamformed by Tx BF 458, converted to analog by D/As 460 and then upconverted for transmission by UPCNVs 462, as shown in FIG. 4A and FIG. 4B.

At block 606, the n Tx spatial streams are routed to corresponding Tx antenna circuits. For example, as shown in FIG. 1, each Tx spatial stream 114 is routed to a corresponding Tx OSSMBF apparatus 108 comprising an SPDT RF Switch 110 whose RF input accepts the spatial stream from MIMO Tx 106 and whose 2 RF outputs are connected to the orthogonally polarized radiating elements of a selectable polarization antenna 112.

At block 608, n distinct time-varying binary codes are synthesized and input to each of the Tx antenna circuits' control ports. For example, the code generator 404 generates n time-varying digital binary orthogonal or uncorrelated codes 116 that are routed to the corresponding Tx antenna circuits 108. In an embodiment, the codes are synchronized to the transmit payload by the code sync logic 406.

At block 610, the instantaneous polarizations of the n Tx spatial streams traversing the n Tx antenna circuits 108 are toggled based on their corresponding polarization control code 116 to produce n distinct reciprocally orthogonal or uncorrelated time varying polarized OSSMBF streams 134 for concurrent, co-channel, interference free directional transmission to an OSSMBF-enabled receiver.

Thus, the method 600 operates to perform transmit orthogonal stream multiplexing and beamforming in accordance with one embodiment of the present invention. It should be noted that the operations of the method 600 are exemplary and not exhaustive. In various embodiments, the operations may be rearranged, modified, deleted, added to, or altered in other ways in accordance with the embodiments.

Figure 7:
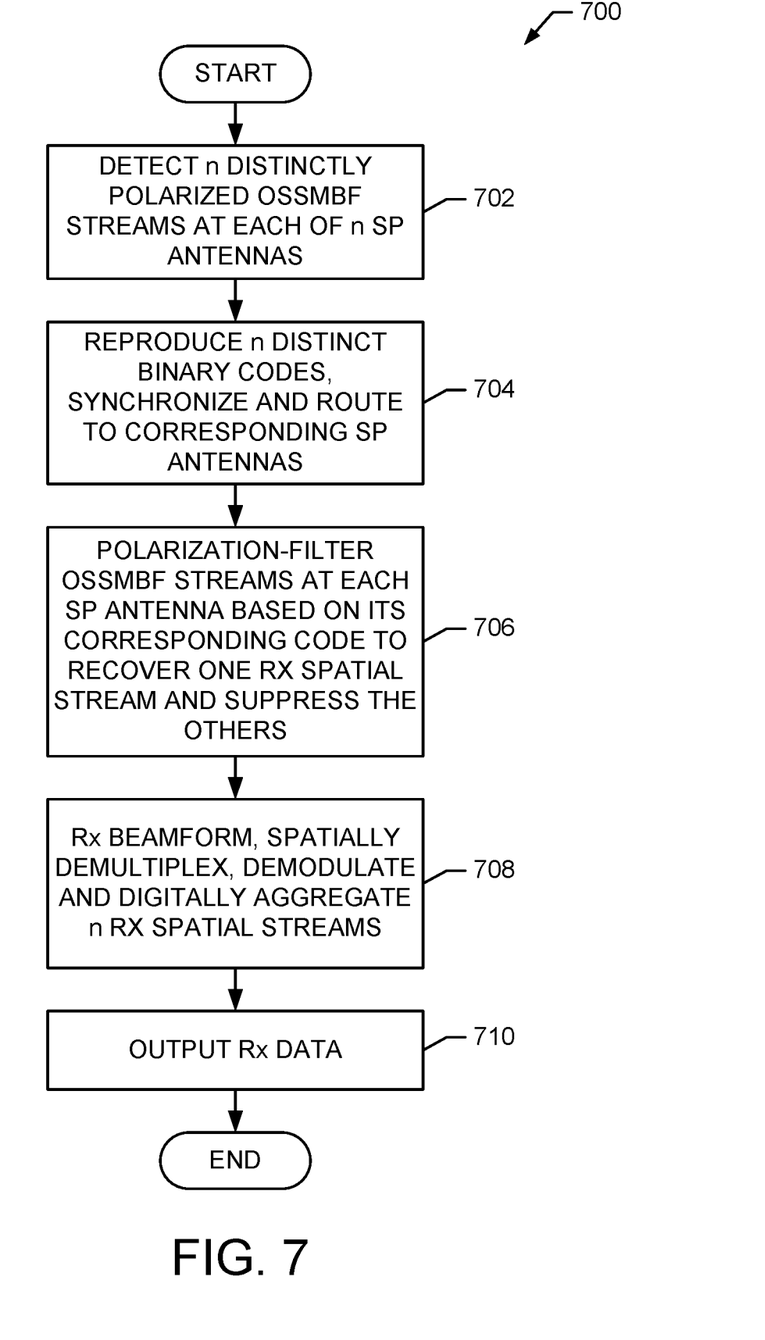
FIG. 7 shows a method for performing receive orthogonal stream spatial multiplexing and beamforming in accordance with one embodiment of the present invention.

FIG. 7 shows a method 700 for performing receive orthogonal stream spatial multiplexing and beamforming in accordance with one embodiment of the present invention. For example, in an exemplary embodiment, the method 700 is suitable for use by OSSMBF Rx 104 shown in FIG. 1.

At block 702, n distinct concurrent, co-channel, stepped carrier phase coherent, orthogonal or uncorrelated time varying polarized OSSMBF streams impinge upon each of n Rx antenna circuits of an OSSMBF-enabled receiver. For example, the n OSSMBF streams 134 generated by the OSSMBF Tx 102 are received at each of the n Rx antenna circuits 122 of OSSMBF Rx 104.

At block 704, the n distinct time-varying binary codes generated at the MIMO transmitter code generator are identically reproduced at the MIMO receiver code generator and input to the n Rx antenna circuits. In addition, a synchronization process is performed to coordinate the timing of the MIMO receiver codes with those of the MIMO transmitter. For example, code sync logic 506 and code generator 504 within MIMO Rx 120 combine to generate n time-varying binary orthogonal or uncorrelated codes 130 (identical to and synchronized with the n codes 116 generated at MIMO Tx 106 code generator 404) for input to corresponding Rx antenna circuits 122.

At block 706, the n time-varying polarization codes from the MIMO receiver code generator toggle the instantaneous polarization of their corresponding Rx antenna circuits, thereby creating n distinct "matched polarization filters" that each pass unsuppressed to the MIMO receiver only the one received OSSMBF stream exhibiting the identical time varying polarization as that particular Rx antenna circuit while suppressing all the other OSSMBF streams. For example, with the n received OSSMBF streams 134 concurrently impinging on Rx antenna circuit 122(1), and with Rx polarization control signal 130(1) (manifesting polarization code 1) establishing the time-varying polarization filtering characteristic of Rx antenna circuit 122(1), only the OSSMBF stream transmitted from OSSMBF Tx Apparatus 1 108(1) (also time varying polarized according to polarization code 1) will traverse OSSMBF Rx Apparatus 122(1) without suppression, and propagate as a partially separated and extricated Rx spatial stream 128(1) to MIMO Rx 120. All the other n−1 OSSMBF streams contained in 134 will be suppressed within the Rx antenna circuit 122(1).

At block 708, the n partially separated and extricated Rx spatial streams output from n OSSMBF Rx Apparatus are downconverted to baseband and digitized for MIMO Rx processing. The MIMO Rx processing comprises individual Rx spatial stream receive beamforming (e.g., carrier phase adjustment) enabled SNR maximization by virtue of highly directional reception and spatial demultiplexing enabled SIR maximization by virtue of eliminating all remaining vestiges of accompanying polarization-suppressed OSSMBF streams. The resulting n fully separated and extricated, SNR and SIR maximized Rx radio streams are then demodulated into digital streams and parallel to serial converted for aggregation into a single output Rx Data stream. For example, the Rx BF SDMX 502 inputs n Rx spatial streams 128 and processes them into a single Rx Data stream 108 as shown in FIG. 5A and FIG. 5B. For example, the Rx SDMX BF 502 processes the Rx spatial streams 128 into output data via downconversion (552), A/D conversion (554), Rx beamforming (556), spatial demultiplexing (558), demodulating (560), and P/S converting (562), as shown in FIGS. 5A and 5B.

At block 710, a received data stream of data rate n×R Mbps is output from the OSSMBF-capable receiver. For example, Rx Data 132 is output from MIMO Rx 120 within OSSMBF Rx 104.

Thus, the method 700 operates to perform receiver orthogonal stream spatial multiplexing and beamforming in accordance with one embodiment of the present invention. It should be noted that the operations of the method 700 are exemplary and not exhaustive. In various embodiments, the operations may be rearranged, modified, deleted, added to, or altered in other ways in accordance with the embodiments.

In various embodiments, as there are a vast number of possible physical switchable polarization antenna element types, each with perhaps a few distinct mechanisms for switching between orthogonal (H-V or RHCP-LHCP) polarizations, there are countless ways to change/substitute specific physical components without changing the basic operations as described herein.

Exemplary Implementations

In various exemplary embodiments, incorporating the herein described OSSMBF methods and apparatus into legacy $n^{th}$ order MIMO spatial multiplexing and beamforming-configured radio links yields data transfer rates up to n times that of a single stream and, in many instances, an increase in communications range also dependent on n.

IEEE802.11ax WLAN Networks

In an embodiment, methods and apparatus for significant data rate and range enhancement in emerging IEEE802.11ax (equivalently, "WiFi6") WLAN networks comprise:

A. Two WiFi6 transceivers each incorporating an 8×8 MIMO Spatial Multiplexer/Demultiplexer and Beamformer ("WiFiTRX8") that can process 8×1201=9608 Mbps of Tx Data into and from 8 stepped carrier phase coherent MCS11

(i.e., 1024 QAM) 160 MHz BW spatial streams at 5 GHz, plus an $8^{th}$ order Walsh code generator; and B. Two 5 GHz 2H×4W planar arrays of selectable dual polarization (H/V) antenna elements with 0.47λ element spacing ("AA2×4") configurable as OSSMBF Tx/Rx apparatus as described herein, wherein:

C. A WiFiTRX8 and an AA2×4 are configured into an OSSMBF Tx 102 WLAN Access Point apparatus per FIG. 1 and together operate per the transmit method of FIG. 6, and D. A WiFiTRX8 and an AA2×4 are configured into an OSSMBF Rx 104 WLAN Client apparatus per FIG. 1 and together operate per the receive method of FIG. 7.

As a specific example of OSSMBF performance enhancement in IEEE802.11ax communications links, the above transmit apparatus and method would convert 9608 Mbps of Tx Data 108 into 8×5 GHz OSSMBF streams 134 featuring 13 dBi of directional transmit antenna gain while the corresponding receive apparatus and method would convert said OSSMBF streams back into 9608 Mbps of Rx Data 132 while adding another 13 dBi of directional receive antenna gain. A legacy WiFi6-standard such link (i.e., incorporating identical OSSMBF apparatus but bereft of the OSSMBF methods) would only be capable of transporting 2×1201=2402 Mbps of data with 0 dBi total directional antenna gain. OSSMBF atop 8×8 WiFi6 therefore delivers (9608/2402=) 4× the data rate at nearly ($10^{26/20}$=) 20× the communications range of legacy 8×8 WiFi6 on its own.

5 GmmW Mobile Cellular Networks

In an embodiment, methods and apparatus for significantly increased data transfer rate in emerging 5 GmmW mobile cellular networks comprise:

A. A 5 GmmW Base Station transmitter incorporating a 32×32 MIMO Spatial Multiplexer and 32×8 Replicator-Beamformer and a $32^{nd}$ order Walsh code generator ("5 GgNB32×8"). Each 5 GgNB32×8 can process 1848 Mbps of Tx data into one 256-QAM 400 MHz spatial stream at 28 GHz, generate 32 independent such spatial streams, replicate each stream by 8 and independently and arbitrarily coherently offset the carrier phase of each resulting stream to produce a total of 256 stepped phase coherent and cochannel, equal amplitude, modulation and bandwidth 28 GHz MIMO Tx streams (bearing up to 32×1848=59,136 Mbps of Tx Data) for transmission to UE;

B. A 28 GHz 16H×16W planar array of selectable dual polarization (H/V) antenna elements with 0.47λ element spacing ("AA16×16") configured as OSSMBF Tx apparatus as described herein;

C. A 5 GmmW User Equipment receiver incorporating a 32×32 MIMO Beamformer and Spatial Demultiplexer and a $32^{nd}$ order Walsh code generator ("5GUE32"). Each 5GUE32 can directionally receive and demodulate 32 28 GHz 256-QAM, 400 MHz BW spatial streams for aggregation into Rx Data; and D. A 28 GHz 4H×8W planar array of selectable dual polarization (H/V) antenna elements with 0.47λ element spacing ("AA4×8") configured as OSSMBF Rx apparatus as described herein, wherein:

E. The 5 GgnB32×8 and AA16×16 are configured into an OSSMBF Tx 102 cellular base station apparatus per FIG. 1 and together operate per the transmit method of FIG. 6, and F. The 5GUE32 and AA4×8 are configured into an OSSMBF Rx 104 cellular UE apparatus per FIG. 1 and together operate per the method of FIG. 7.

As a specific example of OSSMBF performance enhancement in emerging 5 GmmW mobile cellular networks, the above transmit apparatus and method would convert 59,136 Mbps of Tx Data 108 into 32 8× replicated and phase shifted Tx spatial streams for orthogonal time varying polarization into 256 OSSMBF streams 134 transmitted as thousands of sequential individual pencil beam wavefronts at 28 GHz while a corresponding aggregate of thousands of receive apparatus and method would separate each individual pencil beam wavefront into 32 Rx spatial streams for recovery of (again in the aggregate) 59,136 Mbps of Rx Data 132. Note that currently contemplated 5G spatial multiplexing technology employing the identical OSSMBF equipment but bereft of the OSSMBF methods would only deliver a maximum 2×1848=3696 Mbps of aggregate data transfer, fully 1/16 that of this particular OSSMBF configuration.

IEEE802.11ax WAN Networks

In an embodiment, methods and apparatus for contemplated high capacity WiFi6-based wide area Internet distribution networks comprise:

A. Two WiFi-6 transceivers each incorporating a 32×32 MIMO Spatial Multiplexer and Beamformer ("WiFiTRX32") that can each process 32×1201=38,432 Mbps of Tx/Rx Data into and from 32 stepped carrier phase coherent MCS11 160 MHz spatial streams at 5 GHz, as well as a $32^{nd}$ order Walsh code generator;

B. Two 5 GHz 4H×8W planar arrays of selectable dual polarization (H/V) antenna elements with 0.47λ element spacing ("AA4×8") configured as OSSMBF Tx/Rx apparatus as described herein, wherein C. One WiFiTRX32 and one AA4×8 are configured into an OSSMBF Tx 102 WAN Base Station transmit apparatus per FIG. 1 and together operate per the transmit method of FIG. 6, and D. A WiFiTRX32 and an AA4×8 are configured into an OSSMBF Rx 104 WAN CPE receive apparatus per FIG. 1 and operate per the receive method of FIG. 7.

As a specific example of OSSMBF performance in such WiFi-6 based WAN Base Station to CPE links, the apparatus and methods above would synthesize 32 1201 Mbps OSSMBF streams (netting 38,432 Mbps of data transfer) paired with nearly 42 dB of directional Tx+Rx antenna processing gain. Such performance could support metropolitan wireless networks comprising 25 Gbps Base Stations delivering 60/60/24/7 20 Mbps Internet to 2000 Users within 20 km² for a fraction of what they pay now for cable or DSL.

LEO Satellite Communications Networks

In an embodiment, methods and apparatus for significant data transfer rate increase in emerging LEO Satellite communications networks comprise:

A. A LEOSAT satellite terminal transmitter incorporating a 128×128 MIMO Spatial Multiplexer and 128×8 Replicator-Beamformer, a $128^{th}$ order Walsh code generator ("LEO-STX128×8") that can process 1440 Mbps of Tx Data into 1 64-APSK 250 MHz signal at 40.0 GHz, generate 128 independent such spatial streams, replicate each spatial stream 8×, independently coherently offset the carrier phase of each resulting spatial stream to produce a total of 1024 Tx spatial streams (bearing up to 128×1440=184.3 Gbps) for an up to 470 km downlink toward User earth terminals;

B. An LEOSAT earth terminal receiver incorporating a 1024/8 Beamformer-Combiner, a 128×128 MIMO Spatial Demultiplexer and a $128^{th}$ order Walsh code generator ("LEOSRX1024/8") that can directionally receive 1024 40.0 GHz 64-APSK, 250 MHz spatial streams from Low Earth Orbit for recovery into its particular Rx Data; and C. Two 40.0 GHz 32H×32W planar arrays of selectable dual polarization (LHCP/RHCP) antenna elements with 0.47λ element spacing ("AA32×32") configured as OSSMBF Tx/Rx apparatus as described herein, wherein D. The LEOSTX128×8 and one AA32×32 are configured into an OSSMBF Tx 102 satellite apparatus per FIG. 1 and together operate per the transmit method of FIG. 6, and E. The LEOSRX1024/8 and one AA32×32 are configured into an OSSMBF Rx 104 earth apparatus per FIG. 1 and together operate per the receive method of FIG. 7.

As a specific example of OSSMBF performance in such contemplated LEO satellite to ground links, the apparatus and methods described above could enable a LEOSAT network of 7518 orbiters each comprising 18 LEOSTX128 above to deliver 60/60/24/7 20 Mbps Internet to 2B LEOSRX128 earth stations located anywhere on Earth for far less cost than current cable or DSL.

The exemplary aspects of the present invention will be understood more fully from the detailed description and from the accompanying drawings of various embodiments of the invention, which, however, should not be taken to limit the invention to the specific embodiments, but are for explanation and understanding only. For example, many of the embodiments described herein refer only to vertical and horizontal polarization methods. The invention functions equivalently without limitation when instead employing right hand and left hand circularly polarized (e.g., RHCP and LHCP) polarization techniques.

Methods and apparatus for orthogonal stream spatial multiplexing and beamforming ("OSSMBF") in wireless communications are disclosed. In one embodiment, an OSSMBF method includes splitting, modulating, MIMO spatial multiplexing and transmit beamforming an originating data stream into n Tx spatial streams and coupling them to corresponding selectable polarization antennas controlled via binary orthogonal or uncorrelated codes in an OSSMBF transmit apparatus for concurrent, co-channel mutual-interference free directional transmission, wherein each individual transmitted such OSSMBF stream manifests as time-varying polarization-orthogonal to or uncorrelated with and stepped phase coherent with the other n−1 OSSMBF streams. The method concludes with reception of the n OSSMBF streams at a destination OSSMBF receive apparatus using n corresponding selectable polarization antennas controlled by the same set of distinct binary codes. In this fashion each of the n received OSSMBF streams is polarization-match-filtered and partially separated and extricated from all the others upon detection at its corresponding antenna for subsequent receive beamforming and spatial demultiplexing into fully separated and extricated streams for demodulation and digital aggregation back into the originating data stream. The methods and apparatus described herein apply to arbitrarily large values of n, meaning that n MIMO spatial streams emanating from a common source and featuring equal amplitude, modulation, and bandwidth but bearing distinct data and exhibiting mutually orthogonal time varying polarization and stepped carrier phase coherence will propagate concurrently and mutual interference-free on the same frequency channel on a common directional bearing to a single destination. Otherwise stated, an $n^{th}$ order OSSMBF method and apparatus can multiply a fixed frequency, modulation and bandwidth wireless channel's data transfer rate by n, and its communications range by an amount proportionate to n.

While particular embodiments of the present invention have been shown and described, it will be obvious to those skilled in the art that, based upon the teachings herein, that changes and modifications may be made without departing from these exemplary embodiments of the present invention and its broader aspects. Therefore, the appended claims are intended to encompass within their scope all such changes and modifications as are within the true spirit and scope of this exemplary embodiments of the present invention.

What is claimed is:

1. A transmitter apparatus comprising:
   a MIMO transmitter that receives a Data Stream and generates a plurality of RF Tx spatial streams that are spatially encoded for concurrent, co-channel transmission and transmit beamformed for radiation in a precise spatial direction;
   a code generator that generates a plurality of distinct polarization control signals; and
   a plurality of transmit antenna circuits that receive the plurality of Tx spatial streams and the plurality of polarization control signals and generate a plurality of distinctly polarized radiated streams, wherein each transmit antenna circuit comprises:
      first and second orthogonally polarized transmit antenna elements; and
      an RF switch that selectively connects a Tx spatial stream to the first and second orthogonally polarized transmit antenna elements based on a corresponding polarization control signal.

2. The apparatus of claim 1, wherein the MIMO transmitter comprises a data splitter, radio modulators, a MIMO spatial multiplexer and a transmit beamformer.

3. The apparatus of claim 2, wherein the data splitter and radio modulators synthesize a plurality of equal amplitude, modulation and bandwidth Tx radio streams from the Data Stream.

4. The apparatus of claim 2, wherein the MIMO spatial multiplexer spatially encodes the plurality of Tx radio streams into the plurality of Tx spatial streams that can be transmitted free of mutual interference, concurrently and on the same channel.

5. The apparatus of claim 2, wherein the transmit beamformer adjusts each Tx spatial stream's carrier phase so the Tx spatial streams can be radiated in the precise spatial direction.

6. The apparatus of claim 1, wherein the code generator synthesizes a plurality of distinct digital binary time-varying orthogonal or uncorrelated sequenced polarization control signals, and wherein the MIMO transmitter further comprises sync logic that synchronizes the plurality of polarization control signals with the Tx spatial streams' symbol rates.

7. The apparatus of claim 1, wherein the first and second orthogonally polarized transmit antenna elements of the transmit antenna circuits are configured to provide one of horizontal and vertical orthogonality or right-hand circular polarization (RHCP) and left-hand circular polarization (LHCP) orthogonality.

8. A receiver apparatus, comprising:
   a plurality of receive antenna circuits that each detects a plurality of concurrent, co-channel, stepped carrier phase coherent and distinctly polarized RF radiated streams, receives a distinct one of a plurality of polarization control signals, and outputs an Rx spatial stream comprising one unsuppressed polarization-filtered radiated stream, and wherein each receive antenna circuit comprises:
      first and second orthogonally polarized receive antenna elements; and
      an RF switch that selectively connects outputs of the first and second orthogonally polarized receive antenna elements to a MIMO receiver based on a corresponding polarization control signal; and the MIMO receiver that generates the plurality of polarization control signals and a Data Stream from a plurality of Rx spatial streams that are spatially decoded to consummate concurrent, co-channel transmission and receive beamformed for detection from a precise spatial direction.

9. The apparatus of claim 8, wherein the first and second orthogonally polarized receive antenna elements are configured to provide one of horizontal and vertical orthogonality or RHCP and LHCP orthogonality.

10. The apparatus of claim 8, wherein the MIMO receiver comprises:
a code generator that synthesizes a plurality of distinct digital binary time-varying orthogonal or uncorrelated sequenced polarization control signals, wherein each polarization control signal is associated with a corresponding received radiated stream; and
sync logic that synchronizes the plurality of polarization control signals with their corresponding radiated streams' symbol rates.

11. The apparatus of claim 8, wherein the MIMO receiver comprises a receive beamformer, a MIMO spatial demultiplexer, radio demodulators, and a digital data combiner.

12. The apparatus of claim 11, wherein the receive beamformer adjusts each Rx spatial stream's carrier phase so that the Rx spatial streams can be detected from the precise spatial direction.

13. The apparatus of claim 11, wherein the MIMO spatial demultiplexer spatially decodes the plurality of Rx spatial streams into a plurality of Rx radio streams for subsequent demodulation and digital aggregation into the Data Stream.

14. A method, comprising:
a transmit operation that converts a Data Stream into a plurality of concurrent, co-channel, stepped carrier phase coherent and directionally radiated RF streams, wherein each radiated stream comprises polarization distinct from other radiated streams, and
a receive operation that directionally detects a plurality of concurrent, co-channel, stepped carrier phase coherent and distinctly polarized radiated RF streams, wherein the plurality of detected radiated streams is polarization-filtered for subsequent conversion into the Data Stream.

15. The method of claim 14, wherein
the transmit operation comprises emitting the plurality of radiated streams in a distinct spatial direction from a corresponding plurality of transmit antennas, wherein each transmit antenna impresses distinct, time varying orthogonal or uncorrelated sequenced polarization upon its corresponding radiated stream; and
the receive operation comprises detecting the plurality of radiated streams from a distinct spatial direction at each of a plurality of receive antennas, wherein each receive antenna impresses distinct, time-varying orthogonal or uncorrelated sequenced polarization filtering upon its detected plurality of radiated streams corresponding identically to the polarization of one selected radiated stream.

16. The method of claim 15, wherein the transmit operation and the receive operation provide selectable vertical and horizontal polarization or right-hand circular polarization (RHCP) and left-hand circular polarization (LHCP) based on a polarization control signal.

17. The method of claim 16, wherein:
the transmit operation comprises polarizing a plurality of Tx spatial streams at a corresponding plurality of transmit antennas into a plurality of radiated streams based on a corresponding plurality of distinct, time varying binary orthogonal or uncorrelated sequenced polarization control signals; and
the receive operation comprises polarization-filtering the plurality of detected radiated streams at a corresponding plurality of receive antennas using the same polarization control signals associated with the transmit operation, such that each receive antenna functions as a distinct matched polarization filter that outputs a partially separated and extricated Rx spatial stream comprising one unsuppressed polarization filtered radiated stream and a remaining plurality of suppressed polarization filtered radiated streams.

18. The method of claim 16, wherein:
the transmit operation further comprises splitting and modulating an input Data Stream into a plurality of Tx radio streams and then MIMO spatial multiplexing and transmit beamforming the streams into a plurality of concurrent, co-channel, stepped carrier phase coherent and equal amplitude, modulation and bandwidth Tx spatial streams; and
the receive operation further comprises receive beamforming, MIMO spatial demultiplexing, radio demodulating and digitally aggregating a plurality of Rx spatial streams to generate an output Data Stream.

19. The method of claim 18, wherein
the MIMO spatial multiplexing operation comprises spatially encoding a plurality of Tx radio streams into a plurality of Tx spatial streams that can be transmitted free of mutual interference, concurrently and on the same channel; and
the MIMO spatial demultiplexing operation comprises spatially decoding the plurality of concurrent, co-channel Rx spatial streams (each comprising one unsuppressed polarization-filtered radiated stream plus a remaining plurality of suppressed polarization-filtered radiated streams) into a plurality of fully separated and extricated Rx radio streams for subsequent demodulation into a plurality of digital streams.

20. The method of claim 18, wherein
the transmit beamforming operation comprises impressing a plurality of Tx spatial streams with stepped carrier phase coherence allowing radiation in a precise spatial direction; and
the receive beamforming operation comprises impressing a plurality of Rx spatial streams with stepped carrier phase coherence allowing detection from a precise spatial direction.

* * * * *